(12) United States Patent
Blach

(10) Patent No.: US 7,270,471 B2
(45) Date of Patent: Sep. 18, 2007

(54) EXTRUDER

(75) Inventor: Josef A. Blach, Lauffen (DE)

(73) Assignee: Blach Verwaltungs GmbH & Co. KG, Lauffen (DE)

( * ) Notice: Subject to any disclaimer, the term of this patent is extended or adjusted under 35 U.S.C. 154(b) by 357 days.

(21) Appl. No.: 10/503,143

(22) PCT Filed: May 14, 2003

(86) PCT No.: PCT/EP03/05074

§ 371 (c)(1),
(2), (4) Date: Jul. 30, 2004

(87) PCT Pub. No.: WO2004/009326

PCT Pub. Date: Jan. 29, 2004

(65) Prior Publication Data

US 2005/0084559 A1    Apr. 21, 2005

(30) Foreign Application Priority Data

Jul. 22, 2002  (DE) .................................. 102 33 213

(51) Int. Cl.
*B29B 7/48* (2006.01)
*B29C 47/40* (2006.01)
(52) U.S. Cl. .......................................... 366/85; 366/90
(58) Field of Classification Search ............ 366/79–91; 425/204, 208, 209
See application file for complete search history.

(56) References Cited

U.S. PATENT DOCUMENTS

| 2,676,355 | A | 4/1954 | Pasquetti |
| 3,667,733 | A | 6/1972 | Fritsch |
| 4,940,329 | A * | 7/1990 | Dienst ......................... 366/85 |
| 5,044,757 | A * | 9/1991 | Dienst ......................... 366/85 |
| 5,234,656 | A * | 8/1993 | Kniss ......................... 425/208 |
| 5,370,456 | A * | 12/1994 | Yamaoka ..................... 366/80 |
| 5,630,968 | A * | 5/1997 | Wang et al. .................. 366/82 |
| 5,836,682 | A | 11/1998 | Blach |
| 6,196,711 | B1 | 3/2001 | Blach et al. |
| 6,790,025 | B2 * | 9/2004 | Yamaguchi et al. ........ 425/204 |
| 2004/0141405 | A1 | 7/2004 | Blach et al. |
| 2005/0084559 | A1 * | 4/2005 | Blach ......................... 425/208 |

FOREIGN PATENT DOCUMENTS

DE    813 154    9/1951

(Continued)

OTHER PUBLICATIONS

International Search Report mailed Sep. 19, 2003 in PCT International Application No. PCT/EP03/05074 (3 pages).

*Primary Examiner*—Charles E. Cooley
(74) *Attorney, Agent, or Firm*—Flynn, Thiel, Boutell & Tanis, P.C.

(57) ABSTRACT

In an extruder for continuous working and/or processing of flowable substances having at least two parallel, corotating shafts equipped with intermeshing screw elements whose face is limited by circular arcs corresponding to the outside screw diameter, the screw core diameter and at most the center distance of the screw elements, and guided on circular segments of the extruder housing that are parallel to the shafts, at least one screw element (1) has a plurality of concentric ring portions (8) spaced a distance apart and formed by grooves (12) turned into the screw element (1).

16 Claims, 3 Drawing Sheets

FOREIGN PATENT DOCUMENTS

| | | |
|---|---|---|
| DE | 2 003 593 | 10/1971 |
| DE | 28 54 207 | 6/1980 |
| DE | 29 34 297 | 3/1981 |
| DE | 3205428 A1 * | 11/1982 |
| EP | 0 002 131 | 6/1982 |
| EP | 0 422 272 | 4/1991 |
| EP | 0 788 867 | 8/1997 |
| EP | 1 002 633 | 5/2000 |
| JP | 02-062222 | 3/1990 |
| JP | 5-49889 * | 3/1993 |
| JP | 8-197597 * | 8/1996 |
| WO | WO 02/090087 | 11/2002 |
| WO | 03/070442 A1 * | 8/2003 |
| WO | 2004/009326 A1 * | 1/2004 |
| WO | 2004/009327 A1 * | 1/2004 |

* cited by examiner

Fig. 1
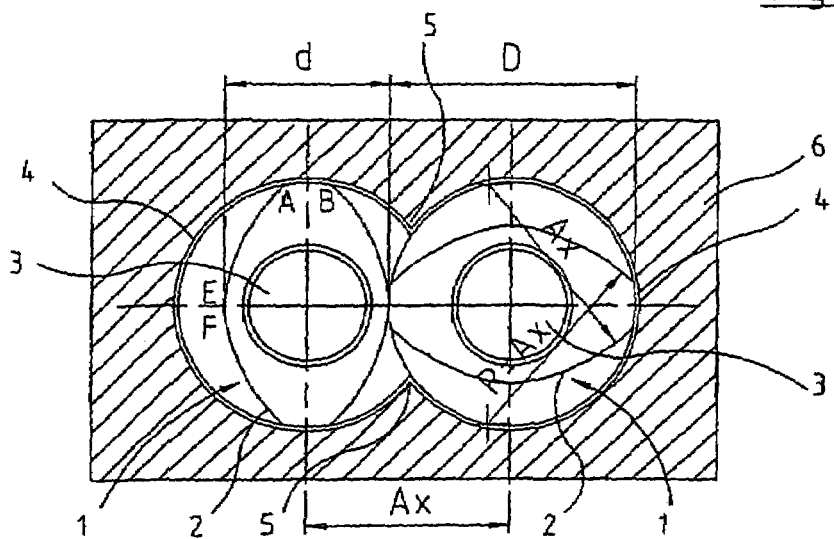
Fig. 2a
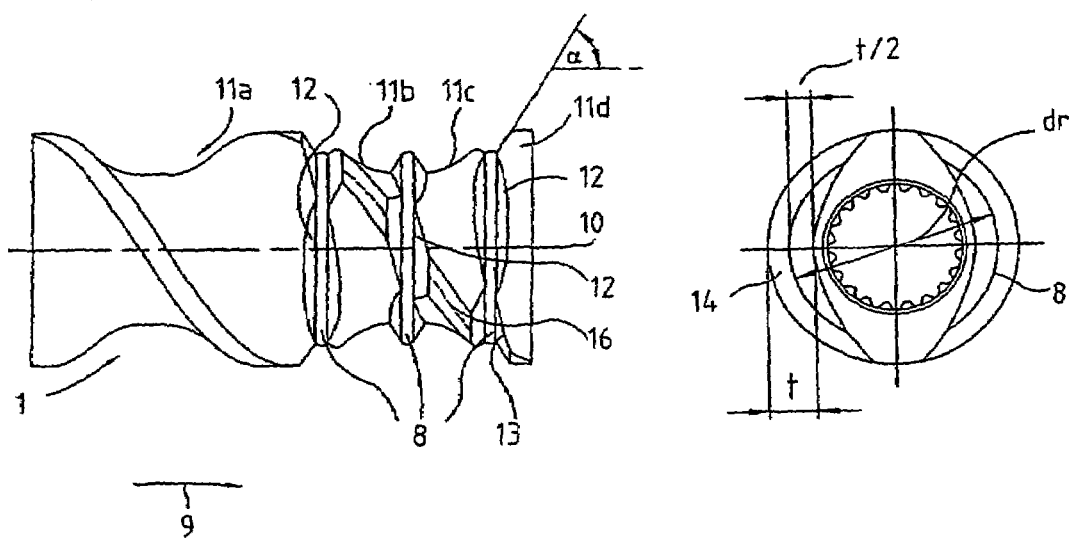
Fig. 2c
Fig. 2b
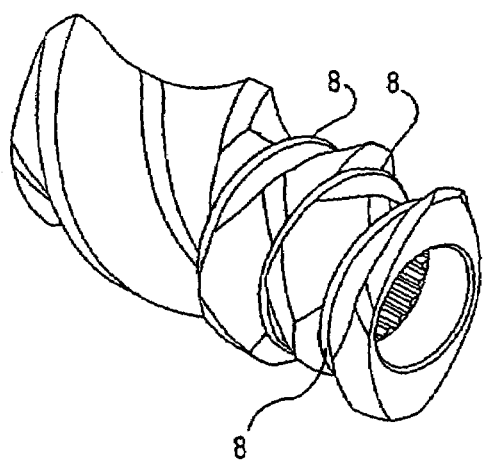

EXTRUDER

FIELD OF THE INVENTION

This invention relates to an extruder for continuous working and/or processing of flowable substances having at least two parallel, co-rotating shafts with intermeshing screw elements.

BACKGROUND OF THE INVENTION

For continuous working, i.e. in particular mixing and kneading, of flowable, i.e. liquid, viscous, plastic or particulate, substances, so-called kneading blocks consisting of disk cams disposed offset in the manner of a spiral staircase are used in twin-shaft extruders (cf. DE-C-813154). The substance is pressed through a narrow tapered gap between the disk cams and the extruder housing, which can result in different heating and partial overstressing by shearing of the substance, and further causes locally above-average wear.

DE-A-2 003 593 already discloses a twin-shaft extruder wherein the screw flight of one screw is sealed by a sealing bar while the other screw has a recess at the place in the screw crest that moves past said sealing bar upon rotation. Here, too, the material blocked with the sealing bar in the flight of the screw is subjected to high stress, while the screw with the recess makes only a small contribution to working the substance.

The problem of the invention is to convert the driving energy of the extruder optimally into uniform working and treatment of the substance.

SUMMARY OF THE INVENTION

According to the invention, the extruder for continuous working and/or processing of flowable substances has at least two parallel, corotating shafts equipped with intermeshing screw elements. The face of each screw element is limited by circular arcs corresponding to the outside screw diameter, the screw core diameter and at most the center distance of the screw elements. The screw elements are guided on circular segments of the extruder housing that are parallel to the shafts.

According to the invention, the extruder has at least one screw element provided with a plurality of ring portions disposed at a distance apart concentrically or coaxially with the screw shaft and formed by grooves turned into the screw element.

The screw portions of the screw element between the ring portions first cause a pressure buildup which then urges the substance through the annular gap between extruder housing and the ring portions with shearing action and elongation, and the pressure is reduced again. The recurring sequence of shear gap passage, pressure buildup, shear gap passage, etc., on the screw elements causes a defined stress on the substance and thus a uniform stress, without unduly stressing the substance or the screw.

The annular and/or shear gap between the ring portions and the concave circular segments of the extruder housing can have a different height to produce a sufficient mixing and/or kneading effect in accordance with the particular substance. The ring portion might for this purpose correspond only to the core diameter of the screw shaft. However, the annular gap preferably has a height of from 10 percent to 90 percent of the flight depth of the screw. Especially preferred is a diameter of the ring portions that corresponds approximately to the center distance of two adjacent shafts.

Before the substance is stressed during passage through the annular or shear gap, it must be transported a certain conveying distance by a screw portion to build up the required pressure. For this purpose the screw portions located between two adjacent ring portions generally have a length of at least $1/10$, preferably at least $1/5$, of the screw diameter. The ring portions are preferably formed by grooves turned into the screw element. The turned grooves preferably have a depth of for example $1/2$ or less of the flight depth. The angle of the flanks of the turned grooves can be for example 30 to 90 degrees. Preferably, oblique grooves are turned, in particular with an angle of about 60 degrees to the shaft axis.

By stock removal on the screw crest and flanks, the screw element can be provided with further portions. Thus, in particular a mixing section with substantially neutral conveying action can be provided by stock removal.

Thus, the invention provides in particular for multi-shaft extruders a screw element which can meet the most diverse requirements of process engineering from defined longitudinal mixing of large volumes in the deciliter range to intensive and lasting action in the centi- to milliliter range.

After the annular gaps the screw flight can continue at the same pitch angle. That is, the screw portions of the screw element can form a continuous screw flight, apart from the turned interruptions in the area of the ring portions.

The ring portions permit additional dispersing surfaces to be gained. A substantial enlargement of dispersing surface can moreover be obtained if the screw portions between the ring portions are disposed at a progressive angular offset from each other with the same sense of rotation, for example at an angular offset by half the flight angle. The angularly offset screw portions form faces angularly offset in step-like fashion as additional dispersing surfaces.

The inventive extruder can have only two screw shafts. However, it can also have at least three shafts disposed along a circle or circular arc with the same central-angle distance within a cavity of the extruder housing, the extruder housing being provided on the radially inner and outer sides of the cavity with concave circular segments parallel to the extruder axis, on which the screw elements are tightly guided, as described for example in EP-B-0788867. The inventive screw elements thus permit substance to pass through the ring of shafts from one side of the cavity to the other.

BRIEF DESCRIPTION OF THE DRAWINGS

In the following, the inventive extruder will be explained in more detail with reference to the drawings, in which:

FIG. 1 shows a cross section through a twin-shaft extruder with screw elements closely intermeshing on the whole circumference;

FIGS. 2a to 2c show a side view, perspective view and view of the transverse profile of a first embodiment of the screw element;

DETAILED DESCRIPTION

Figure 3A:
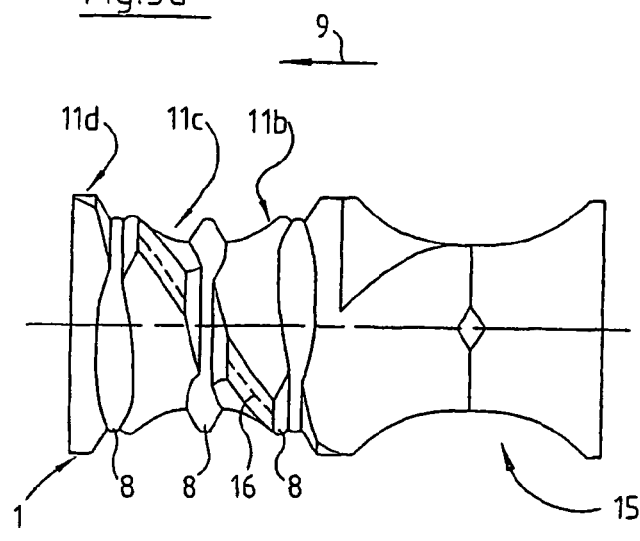
FIGS. 3a to 3c show a side view, perspective view and view of the transverse profile of a second embodiment of the screw element.

According to FIG. 1, screw elements 1 have transverse profile 2 composed of three circular arcs A-B, E-F and A-E. Circular arc A-B has a diameter corresponding to outside screw diameter D, circular arc E-F has a diameter corresponding to screw core diameter d, and circular arc A-E has a diameter whose radius corresponds to center distance Ax of the two screw elements 1 (cf. EP-B-0002131).

Intermeshing screw elements 1 of the twin-shaft extruder are fitted so as to rotate in unison on two parallel, corotating shafts 3 guided on circular segments 4 of extruder housing 6 that are parallel to screw shafts 3, so that two wedges 5 are formed.

According to FIGS. 2a to 2c, double-flighted screw element 1 has three ring portions 8 concentric with shaft axis 7 and disposed a distance apart.

Ring portions 8 are provided on the side of screw element 1 facing the outlet of the extruder here, with respect to the conveying direction shown by arrow 9, i.e. in conveying direction 9 there is long screw portion 11a, followed after first two ring portions 8 by two shorter screw portions 11b and 11c, and after third ring portion 8 by even shorter screw portion 11d.

While screw portion 11a corresponds approximately to screw diameter D, the distance between ring portions 8 corresponds to about one third of the screw diameter, and the distance of the face of screw segment 11d from adjacent ring portion 8 to only about ⅙ D.

Ring portions 8 are obtained by grooves 12 turned into screw element 1. Angle α of flanks 13 of grooves 12 to shaft axis 10 is about 60 degrees.

The height of annular gaps 14 between ring portions 8 and extruder housing 6 is according to FIG. 2c about half of flight depth t, i.e. half the difference between core diameter d and outside screw diameter D (FIG. 1). Diameter dr of ring portions 8 thus corresponds approximately to center distance Ax of shafts 3 from each other.

Figure 3C:
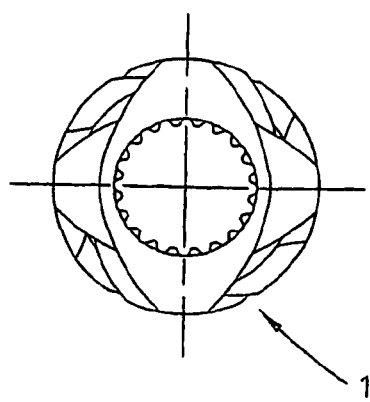
Figure 3B:
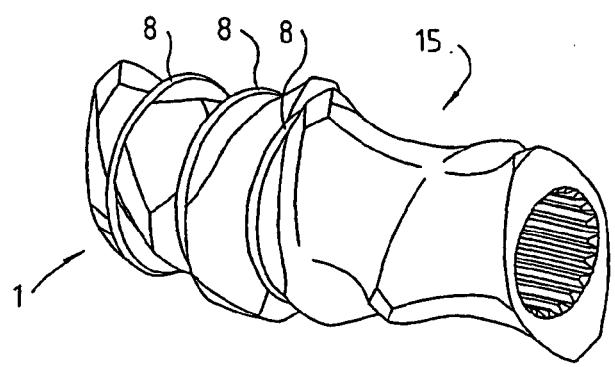

Screw element 1 according to FIGS. 3a to 3c differs from that according to FIGS. 2a to 2c substantially in that, instead of screw portion 11a, portion 15 with neutral conveying action is provided which is formed by corresponding stock removal on the screw crest of screw element 1.

Screw element 1 according to FIGS. 3a to 3c is suitable in particular for an extruder having three or more screw elements disposed along a circle or circular arc with the same central-angle distance within a cavity of an extruder housing and dividing the cavity into an inside space and outside space. As mentioned, material must be balanced between the inside and outside spaces in such ring extruders. While ring portions 8 and short screw portions 11b, 11c and 11d of the screw element according to FIGS. 3a to 3c inhibit the product flow, portion 15 permits passage from one process space to the other.

Figure 4:
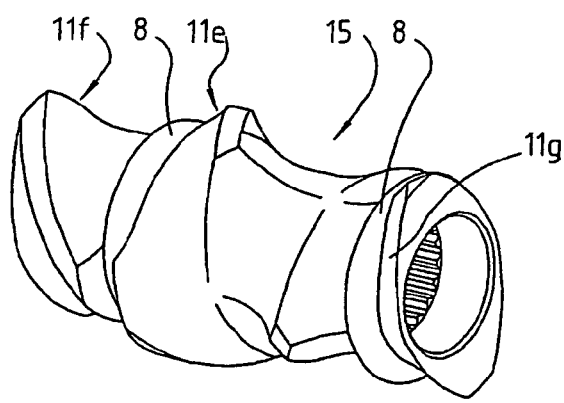
FIG. 4 shows a perspective view of a third embodiment of the screw element.

The screw element according to FIG. 4 differs from that according to FIGS. 3a to 3c substantially in that only two ring portions 8 are provided, one ring portion 8 being disposed between one face of screw element 1 and portion 15 with neutral conveying action, and two screw portions 11e and 11f separated by second ring portion 8, and further screw portion 11g being provided between the face of screw element 1 and ring portion 8 on portion 15.

In screw element 1 according to FIGS. 2a to 2c, FIGS. 3a to 3c and FIG. 4 a continuous screw flight is formed, as indicated by dashed line 16 in FIG. 2a, which is interrupted only by turned grooves 12 with ring portions 8.

Figure 5:
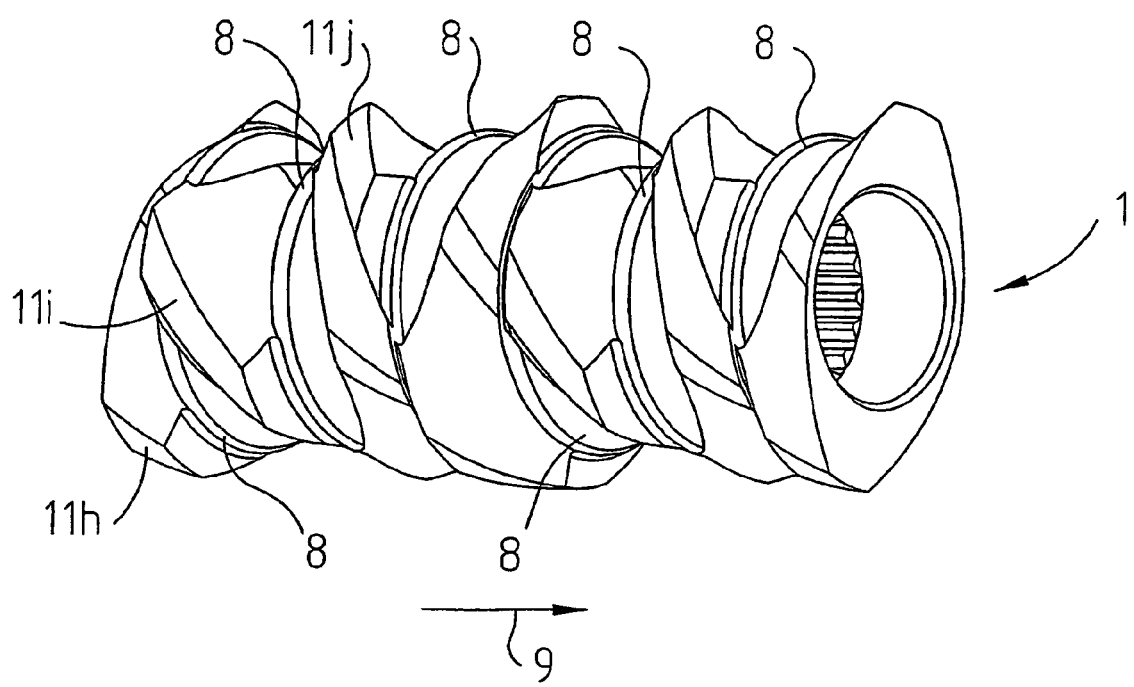
FIG. 5 shows a perspective view of a fourth embodiment of the screw element.

In contrast, in the embodiment according to FIG. 5 screw portions 11h, 11i, 11j . . . between ring portions 8 are disposed at a progressive angular offset from each other with the same sense of rotation.

The invention claimed is:

1. An extruder for continuous working and/or processing of flowable substances having at least two parallel, corotating shafts equipped with intermeshing screw elements whose face is limited by circular arcs corresponding to the outside screw diameter, the screw core diameter and at most the center distance of the screw elements, and guided on circular segments of the extruder housing that are parallel to the shafts, wherein at least one screw element has a plurality of concentric ring portions formed by grooves turned into the screw element and spaced a distance apart axially, said at least one screw element including at least one screw portion between said concentric ring portions, and wherein the axial distance between said concentric ring portions of the screw element is not greater than the outside screw diameter.

2. An extruder according to claim 1, wherein the axial distance between the ring portions of the screw element is at least ⅒ of the screw diameter.

3. An extruder according to claim 1, wherein the height (h) of an annular gap between the ring portions and the circular segments of the extruder housing corresponds to one quarter to three quarters of the flight depth (t) and each of the circular segments of the extruder housing have the same diameter along the entire length thereof.

4. An extruder according to claim 1, wherein the diameter of the ring portions corresponds approximately to the center distance (Ax) of the shafts.

5. An extruder according to claim 1, wherein the screw portions of the screw element form a continuous screw flight between the ring portions and along a length thereof, apart from the interruption in the area of each said ring portion.

6. A device according to claim 1, wherein the screw element further comprises at least one neutral portion axially spaced from said concentric ring portions that provides neutral conveying action.

7. An extruder for continuous working and/or processing of flowable substances having at least two parallel, corotating shafts equipped with intermeshing screw elements whose face is limited by circular arcs corresponding to the outside screw diameter, the screw core diameter and at most the center distance of the screw elements, and guided on circular segments of the extruder housing that are parallel to the shafts, wherein at least one screw element has a plurality of concentric ring portions spaced a distance apart axially, and flanks of the ring portions extend obliquely to the shaft axis, said at least one screw element including at least one screw portion between said concentric ring portions.

8. An extruder for continuous working and/or processing of flowable substances having at least two parallel, corotating shafts equipped with intermeshing screw elements whose face is limited by circular arcs corresponding to the outside screw diameter, the screw core diameter and at most the center distance of the screw elements, and guided on circular segments of the extruder housing that are parallel to the shafts, wherein at least one screw element has a plurality of concentric ring portions spaced a distance apart axially, said at least one screw element including screw portions between the concentric ring portions that are disposed at a progressive angular offset from each other with the same sense of rotation.

9. An extruder for extruding flowable substances comprising:

at least two parallel, co-rotating shafts having intermeshing screw elements whose face is limited by circular arcs corresponding to an outside screw diameter D, a screw core diameter d and at most a center distance Ax of the screw elements, at least one of said screw elements including at least three axially spaced concentric ring portions having flanks that extend oblique to a shaft axis of said shaft and respective screw portions located between the ring portions for providing a defined stress on the flowable substance and uniform stress without unduly stressing the substance or the screw element as the flowable substance flows in an axial direction with respect to the length of the shafts; and an extruder housing having concave circular segments that receive said shafts having said screw elements.

10. The extruder of claim 9, wherein the axial distance between the ring portions of each said screw element is at least $\frac{1}{10}$ of the screw diameter and not greater than the outside screw diameter.

11. The extruder of claim 9, wherein the screw elements each include at least one neutral portion having a neutral conveying action.

12. An extruder for extruding flowable substances comprising:

at least two parallel, co-rotating shafts having intermeshing screw elements whose face is limited by circular arcs corresponding to an outside screw diameter D, a screw core diameter d and at most a center distance Ax of the screw elements, at least one of said screw elements including at least three axially spaced concentric ring portions and respective screw portions positioned axially along the entire distance between said concentric ring portions for providing a defined stress on the flowable substance and uniform stress without unduly stressing the substance or the screw element as the flowable substance flows in an axial direction with respect to the length of the shafts; and an extruder housing having concave circular segments that receive said shafts having said screw elements, wherein each said screw element is a solid, monolithic, one-piece element into which two or more grooves are cut to form said ring portions.

13. The extruder of claim 12, including respective annular gap passages defined between an outer edge of the respective ring portions and the corresponding circular segment of the housing, wherein the alternating ring portions and screw portions provide a recurring sequence of pressure build up of the flowable substance and after passing the gap passages relieving part of the pressure build up of the flowable substance.

14. The extruder of claim 12, including an annular gap between the ring portions and the concave circular segments of the extruder housing, the annular gap having a height of from 10 percent to 90 percent of the flight depth t of the screw elements, and wherein the grooves have a depth of $\frac{1}{2}$ or less of the flight depth t.

15. An extruder for extruding flowable substances comprising:

at least two parallel, co-rotating shafts having intermeshing screw elements whose face is limited by circular arcs corresponding to an outside screw diameter D, a screw core diameter d and at most a center distance Ax of the screw elements, at least one of said screw elements including at least three axially spaced concentric ring portions and respective screw portions located between said ring portions and disposed in a progressive angular offset from each other with the same sense of rotation for providing a defined stress on the flowable substance and uniform stress without unduly stressing the substance or the screw element as the flowable substance flows in an axial direction with respect to the length of the shafts; and an extruder housing having concave circular segments that receive said shafts having said screw elements.

16. An extruder for extruding flowable substances comprising:

a least two parallel, co-rotating shafts having intermeshing screw elements whose face is limited by circular arcs corresponding to an outside screw diameter D, a screw core diameter d and at most a center distance Ax of the screw elements, at least one of said screw elements including at least three axially spaced concentric ring portions, each said screw element having a continuous screw flight that is interrupted only by turned grooves forming said ring portions, and each said screw element having respective screw portions located between the ring portions for providing a defined stress on the flowable substance and uniform stress without unduly stressing the substance or the screw element as the flowable substance flows in an axial direction with respect to the length of the shafts; and an extruder housing having concave circular segments that receive said shafts having said screw elements.

* * * * *